(12) United States Patent  
Niste et al.

(10) Patent No.: US 9,475,482 B2  
(45) Date of Patent: Oct. 25, 2016

(54) PLUG-IN HYBRID ELECTRIC VEHICLE

(75) Inventors: Klas Niste, Göteborg (SE); Robert Eriksson, Hålta (SE); Patrik Larsson, Landvetter (SE)

(73) Assignee: V2 PLUG-IN HYBRID VEHICLE PARTNERSHIP HANDELSBOLAG, Gothenburg (SE)

( * ) Notice: Subject to any disclaimer, the term of this patent is extended or adjusted under 35 U.S.C. 154(b) by 132 days.

(21) Appl. No.: 13/609,990

(22) Filed: Sep. 11, 2012

(65) Prior Publication Data

US 2013/0066499 A1    Mar. 14, 2013

(30) Foreign Application Priority Data

Sep. 14, 2011    (EP) .................................... 11181233

(51) Int. Cl.
*B60W 10/26*    (2006.01)
*B60W 20/00*    (2016.01)
*B60K 6/28*    (2007.10)
*B60W 50/023*    (2012.01)
*B60K 6/485*    (2007.10)

(Continued)

(52) U.S. Cl.
CPC ................ *B60W 20/00* (2013.01); *B60K 6/28* (2013.01); *B60K 6/485* (2013.01); *B60K 6/52* (2013.01); *B60L 11/1868* (2013.01); *B60W 10/06* (2013.01); *B60W 10/08* (2013.01); *B60W 10/26* (2013.01); *B60W 20/50* (2013.01); *B60W 50/023* (2013.01); *B60W 2510/244* (2013.01); *B60W 2540/10* (2013.01); *H02J 7/1423* (2013.01); *Y02T 10/6226* (2013.01); *Y02T 10/6265* (2013.01); *Y02T 10/6269* (2013.01); *Y02T 10/6278* (2013.01); *Y02T 10/6286* (2013.01); *Y02T 10/7005* (2013.01)

(58) Field of Classification Search
None
See application file for complete search history.

(56) References Cited

U.S. PATENT DOCUMENTS 5,204,610 A  *  4/1993  Pierson et al. ................. 320/126
5,977,744 A  *  11/1999  Williams .............. H02J 7/1423
                                                                320/104

(Continued)

FOREIGN PATENT DOCUMENTS

WO    2010140253    12/2010

OTHER PUBLICATIONS

International Search Report and Written Opinion from corresponding EP Application No. EP11181233.5, dated Feb. 23, 2012.

*Primary Examiner* — Rami Khatib  
*Assistant Examiner* — Navid Ziaeianmehdizadeh  
(74) *Attorney, Agent, or Firm* — Renner, Otto, Boisselle & Sklar, LLP.

(57) ABSTRACT

A plug-in hybrid electric vehicle includes an internal combustion engine driving a pair of wheels on a first axle and a transmission drivingly connecting the internal combustion engine and the wheels on a first axle. An integrated starter-generator is mounted on the internal combustion engine crankshaft between said internal combustion engine and the transmission. The vehicle further includes an electric motor driving a pair of wheels on a first axle and a main battery pack connected to a further electric motor arranged to supply electric power for driving the wheels on a second axle. The electric drive means can comprise one electric motor driving the second axle via a differential, two electric motors each driving one half of the second axle or two electric wheel motors for the respective wheels on the second axle. An additional battery is connected to the integrated starter-generator for starting the engine.

11 Claims, 3 Drawing Sheets

(51) Int. Cl.
*B60K 6/52* (2007.10)
*B60W 10/06* (2006.01)
*B60W 10/08* (2006.01)
*B60L 11/18* (2006.01)
*H02J 7/14* (2006.01)

(56) References Cited

U.S. PATENT DOCUMENTS

| | | | |
|---|---|---|---|
| 6,114,775 A * | 9/2000 | Chung et al. | 307/10.1 |
| 6,734,651 B2 * | 5/2004 | Cook | F02N 11/0866 320/103 |
| 7,339,347 B2 * | 3/2008 | Elder | B60L 3/0046 307/10.7 |
| 8,428,802 B2 * | 4/2013 | Kizaki | B60W 20/00 105/35 |
| 2002/0052677 A1 | 5/2002 | Lasson et al. | |
| 2007/0296358 A1 | 12/2007 | Sato et al. | |
| 2008/0051248 A1 * | 2/2008 | Kozarekar et al. | 477/3 |
| 2009/0078481 A1 * | 3/2009 | Harris | 180/65.1 |
| 2009/0299561 A1 * | 12/2009 | Matsumoto | 701/22 |
| 2010/0105520 A1 | 4/2010 | Ohbayashi et al. | |
| 2010/0225258 A1 * | 9/2010 | Namuduri | B60K 6/485 318/400.3 |
| 2011/0202210 A1 * | 8/2011 | Goda | 701/22 |
| 2012/0143425 A1 * | 6/2012 | Yamamoto et al. | 701/22 |

* cited by examiner

PLUG-IN HYBRID ELECTRIC VEHICLE

TECHNICAL FIELD

The present disclosure generally relates to plug-in hybrid electric vehicles and, more particularly, to an arrangement and a method for operating plug-in hybrid electric vehicles having i an internal combustion engine connected to a first axle and an electric motor connected to a second axle.

BACKGROUND OF THE INVENTION

Most automotive vehicles include an internal combustion engine as the sole power source for providing drive torque to one or more sets of wheels. To achieve a variety of environmental and fuel economy goals, some vehicles have been configured to include multiple sources of motive power. In one known example, a hybrid vehicle utilizes an internal combustion engine and an electric motor. The internal combustion engine and the electric motor can separately or in combination to provide power to one or more axles through a common driveshaft coupled to a differential. Vehicles of this type are often referred to as series-hybrid vehicles. While this arrangement may have merit, unless some form of traction control is implemented, wheel slippage may occur at the wheel with the lowest traction. Furthermore, the differential may be relatively costly and add undesirable weight to the vehicle.

Another known hybrid vehicle includes single or multiple electric motors connected to one or more axles, where an internal combustion engine is used for driving a generator for providing electrical power to the drive motor or motors. An alternative driving an axle via a costly and relatively heavy differential is to fit each wheel with individual electric motors. Unfortunately, this arrangement adds an unacceptable amount of unsprung weight to each wheel. Vehicles of this type are often referred to as series hybrid vehicles.

A further known hybrid vehicle includes an internal combustion engine for providing drive torque to a first axle and an electric motor for providing drive torque to a second axle. The vehicle can be driven by the internal combustion engine, by the electric motor, or by both the internal combustion engine and the electric motor. Vehicles of this type are often referred to as full hybrid vehicles.

Hybrid vehicles are often provided with a generator driven by the internal combustion engine or with a starter generator mounted on the internal combustion engine in order to supply power to the electric motor or to charge a battery pack. The battery pack is used for driving the electric motor, driving auxiliary equipment, such as an air conditioning unit, or for starting the internal combustion engine.

A problem with hybrid vehicles provided with a hybrid drive arrangement comprising a battery pack of this type is that the plug-in hybrid electric vehicle may become inoperative should the battery pack develop a fault. This is a particular problem for plug-in hybrid electric vehicles. Accordingly, there is a need for alternative hybrid drive arrangement complementing the existing internal combustion engine and electric power transfer systems.

SUMMARY OF THE INVENTION

The above problem is solved by means of a plug-in hybrid electric vehicle and a method for operating a plug-in hybrid electric vehicle according to the appended claims.

The invention relates to a plug-in hybrid electric vehicle with a propulsion system comprising an internal combustion engine driving a pair of wheels on a first axle and a transmission drivingly connecting the internal combustion engine and the wheels on a first axle. A starter-generator, hereafter referred to as an integrated starter generator or ISG, is mounted on the internal combustion engine crankshaft between said internal combustion engine and the transmission. The vehicle further comprises at least one electric motor driving a pair of wheels on a first axle and a main battery pack connected to the at least one electric motor and arranged to supply electric power for driving the wheels on a second axle. The electric drive means can comprise one electric motor driving the second axle via a differential, two electric motors each driving one half of the second axle or two electric wheel motors for the respective wheels on the second axle.

This arrangement allows the vehicle to be operated by the internal combustion engine driving, for instance, a front axle; by at least one electric motor driving, for instance, a rear axle; or by both the internal combustion engine and the at least one electric motor driving the front and rear axles in a four-wheel-drive (4WD) mode.

A power electronics unit is connected between the main battery pack and the at least one electric motor and arranged to convert electric power from the main battery pack from a first voltage to a second voltage. The main battery pack is a relatively high voltage battery rated at, for instance, 120, 220 or 400 V. This voltage is converted to a relatively low voltage, for instance, 12, 24 or 42V. The second voltage is dependent on the type of electric motor(-s) used and the requirements of any auxiliary devices provided in the vehicle, such as air conditioning, radio, running lights, etc. If necessary the power electronics unit can supply power to multiple devices at different voltages. The power electronics unit can supply DC current to a DC motor, or comprise an inverter to supply AC current to an AC motor. For example, in a medium sized compact car, a 400V/12 kWh main battery pack having a capacity to deliver 50 kW peak power and will give an operating range in excess of 50 km.

The power electronics unit comprises a control system that can include one or more microcomputers, including a microprocessor unit, input/output ports, an electronic storage medium for executable programs and calibration values configured as read only a memory chip, a random access memory, and/or a flash memory, and a data bus. The control system can execute the various control routines described herein in order to control the operation of the hybrid electric propulsion system.

Under normal operating conditions, the power electronics unit is connected between the main battery pack and the starter-generator and arranged to supply electric power for starting the internal combustion engine. Electric power is drawn from the main battery pack when it is desired to operate the internal combustion engine for driving the first axle only, or for operating the vehicle in the 4WD mode. The internal combustion engine can also be used for charging the main battery pack. Optionally the main battery pack can also be charged during regenerative braking of the vehicle.

In addition, a first transformer unit is connected to the main battery pack and arranged to supply a charging current to the main battery pack when connected to an external source of electricity. A plug-in hybrid electric vehicle is most effectively charged when the vehicle is stationary, by plugging it into a suitable mains socket or charging station socket. By charging the main battery pack during the night, when parked at home, or during the middle of the day, when parked at a workplace, it is possible to avoid the peak periods for electricity usage on the grid.

According to the invention, the plug-in hybrid electric vehicle is provided with at least one additional battery connected to the starter-generator and arranged to supply electric power for starting the internal combustion engine.

An additional battery can be arranged to be connected to the ISG only, whereby it is isolated from the main battery pack and the power electronics unit. This will require a control unit separate from the power electronics unit for controlling power supply from the additional battery. The at least one additional battery is connected to the starter-generator and is arranged to receive a charging current from the starter-generator. In this example, the additional battery is primarily intended for starting the internal combustion engine, in case of a system failure in the main battery pack and/or the power electronics unit that prevents the main battery pack from being used for propulsion. If such a failure prevents the main battery pack from supplying power to critical auxiliary equipment, then the additional battery can be used for back-up purposes until said battery operates the ISG to start the internal combustion engine. An example of such critical auxiliary equipment is electronic control means for controlling start and operation of the engine.

Alternatively, the at least one additional battery can be connected to the main battery pack via a second transformer unit and that said additional battery is arranged to receive a charging current from the main battery pack. This allows for monitoring of the state of charge and recharging of the additional battery when the internal combustion engine and/or the integrated starter generator are not in use. In this case, the power electronics unit is arranged to detect the state of charge of the additional battery, wherein the power electronics unit is arranged to generate a warning signal if a malfunction is detected.

The power electronics unit is arranged to detect the state of charge of the main battery pack and is arranged to disconnect the main battery pack if a malfunction is detected. Depending on the type of malfunction detected, the power electronics unit will initially disconnect the main battery pack from the electric motor(-s), the integrated starter generator and the transformer unit used for external recharging. Should the malfunction occur in the power electronics unit, then this will also be disconnected from the electric propulsion units and the transformer unit.

The power electronics unit, or the separate control unit for the additional battery, is then arranged to connect the at least one additional battery to the starter-generator and start the internal combustion engine if the main battery pack is disconnected. Should the internal combustion engine be operated at this time, then a disconnection of the main battery pack and/or the power electronics unit will prevent the engine from being switched off, at least until the vehicle is stationary.

The power electronics unit is arranged to control output torque from the internal combustion engine and the electric motor in response to a driver instructed power requirement. For instance, the power electronics unit is arranged to control the electric motor only if the driver instructed power requirement is below a first predetermined level. The driver can also manually select an electric drive mode, which the power electronics unit will maintain as far as possible without overloading the main battery pack. This mode is typically used for a city driving cycle with low to medium acceleration and at speeds up to 50-70 km/h.

Further, the power electronics unit is arranged to control the internal combustion engine and the electric motor, but favouring the electric motor, if the driver instructed power requirement is above the first predetermined level an below a second predetermined level. The driver can also manually select an economy drive mode, which the power electronics unit will operate both the engine and the motor, where the power electronics unit will select the optimum power source for minimizing fuel consumption. This mode of operation can include a start/stop function for the internal combustion engine, such as when stopping at traffic lights, under conditions where the electric motor is less efficient, such as during cold or hot ambient conditions.

The power electronics unit is arranged to control both the internal combustion engine and the electric motor, but favouring the engine, in response to a driver instructed power requirement is above the second predetermined level or during cold or hot ambient conditions. The driver can manually select a power mode, in which the internal combustion engine is arranged to operate at relatively high or full power, with short term assistance from the electric motor. This mode is typically used for high acceleration or travel at relatively high speeds, such as. motorway speeds in excess of 90-110 km/h, where the electric motor can be operated to boost acceleration at kick-down or to assist a vehicle stability system by operating the vehicle in a 4WD mode with traction control for each individual wheel.

Finally, the driver can manually select a permanent 4WD mode, in which the internal combustion engine and the electric motor are operated together in order to maximize traction on slippery or wet surfaces and/or when towing a trailer or similar.

BRIEF DESCRIPTION OF DRAWINGS

The invention will now be described in detail with reference to the appended drawing figures. It is understood that the drawing figures are only illustrations and are not intended to define the scope of the invention, which is defined by the claims appended below. It is further understood that the drawing figures are not necessarily drawn to scale, and that, unless otherwise indicated, the drawing figures only show schematic illustrations of constructions and methods described herein.

DESCRIPTION OF EXAMPLE EMBODIMENTS OF THE INVENTION

Figure 1:
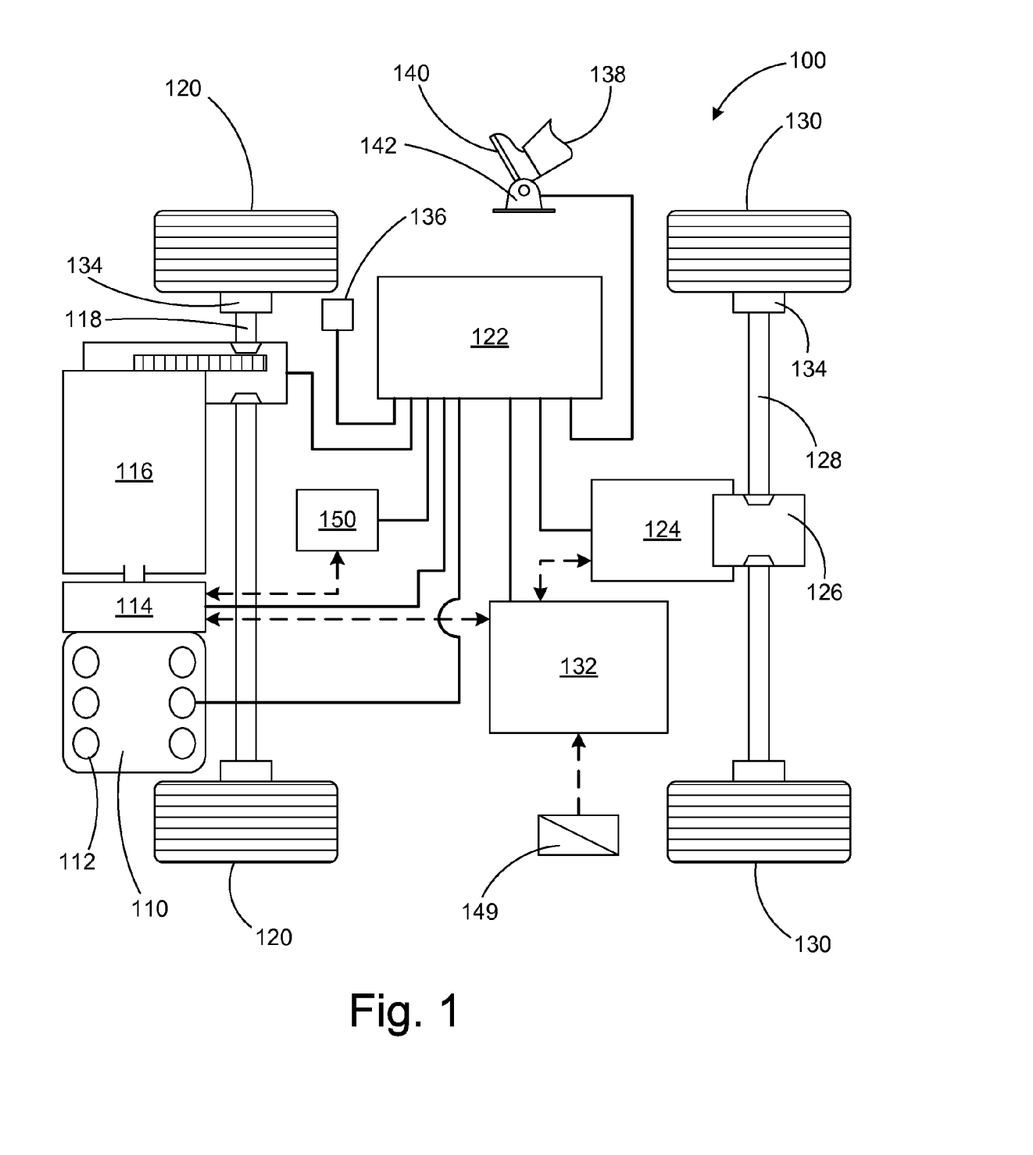
FIG. 1 shows a schematic plug-in hybrid electric propulsion system according to a first embodiment of the invention.

FIG. 1 shows a schematic plug-in hybrid electric propulsion system 100 for a vehicle. In this particular example, the propulsion system 100 is configured to be operated with a front wheel drive arrangement driven by an internal combustion engine and a rear wheel drive arrangement driven by an electric motor. This vehicle platform can be operated using front wheel drive, rear wheel drive or four wheel drive. The hybrid electric propulsion system 100 includes a powertrain comprising an internal combustion engine (ICE) 110, a first electric energy conversion device 114, a transmission 116 for providing torque to front wheels 120, and a second electric energy conversion device 124 for providing torque to the rear wheels 130.

The first and second electric energy conversion devices may be alternatively referred to as motors and/or generators. It will be appreciated that an electric energy conversion device may be any suitable device for converting electric energy to kinetic energy, for driving the vehicle, or for converting kinetic energy to electric energy, for recovering energy during braking or coasting.

The internal combustion engine 110 includes multiple combustion chambers or cylinders 112 for combusting a fuel. As one non-limiting example, the engine 110 can be operated in what may be referred to as an Atkinson cycle. The engine may be operated in an Atkinson cycle to achieve improved fuel efficiency over similarly sized Otto cycle engines, whereby the electric motors may be operated to assist the engine to provide requested driveline torque, for example, during acceleration of the vehicle. Alternatively, the engine 110 may be operated in an Otto cycle or other suitable combustion cycle. It will be appreciated that during different modes of operation the engine may discontinue combustion of fuel in some or all of the cylinders. In this way, fuel efficiency may be increased. The engine 110 can be a diesel engine, a petrol engine or an engine operated on a renewable fuel such as ethanol, methanol, biodiesel, RME, or similar suitable fuels.

The first motor 114 is connected to the output shaft of engine 110. In the example shown, the first motor 114 is configured as a crankshaft integrated starter/generator (ISG). In the text below, both the terms "first motor" and "ISG" is used for this device. During start-up of the internal combustion engine 110, the ISG provides torque to crank the engine to facilitate start-up of the engine. Under some conditions, the ISG can supply torque output to act as a motor to supplement or replace engine torque. Further, under some conditions, the ISG can supply negative torque output to act as a generator that is converted into electric energy for storage in an energy storage device, such as a battery.

The engine 110 and/or the first motor 114 can transmit torque to an input of transmission 116. The transmission 116 transmits torque to a pair of front wheels 120 via front axle (or a final drive) 118. The transmission 130 can include multiple selectable gear ratios used for varying the ratio of speed and/or torque that is transmitted between the engine and/or the ISG and the final drive or front wheels 120. The transmission 116 can be configured as a dual-clutch (i.e. powershift) or automatically shifted manual transmission. Alternatively the transmission 116 can include a torque converter comprising an impeller and a turbine. The transmission can be engaged or disengaged in a conventional manner by varying a state of the torque converter to vary the torque transfer between the impeller and the turbine.

The first motor 114 can be configured in a motor system that includes a suitable gearing to enable the first motor 114 to be selectively operated independently from the internal combustion engine 110. For example a clutch may be used to provide an operative disconnecting means between the ISG 114 and the engine to reduce frictional torque losses from the engine while the ISG is used to generate electrical energy.

FIG. 1 further shows a second electric energy conversion device 124 in communication with a rear axle 128 and a pair of rear wheels 130 via gear configuration or a differential 126. In this example, the second electric energy conversion device or motor 124 is configured as an electric rear axle device (ERAD) system. The ERAD system can include any suitable gearing to enable the second motor to provide torque output to the rear wheels. For example, the gear configuration 126 can include a planetary gear set comprising a carrier, a sun gear, and a ring gear. By varying a state of the planetary gear set, a desired amount of torque exchanged between the second motor 124 and the final shaft 128 is varied. In this way, the second motor 124 can selectively supply or absorb torque to the drive shaft 128 and the rear wheels 130. In an alternative example, the second motor 124 can be coupled directly to a final drive in the form of a differential 128.

The ISG 114 and the ERAD system 124 are operated to exchange torque with drive shafts 118 and 128, respectively. For example, the ISG 114 can be operated to supply torque to drive shaft 118 in response to electrical energy received from an energy storage device 132. Similarly, the ERAD system 124 can be operated to supply torque to the drive shaft 128 in response to electrical energy received from the energy storage device 132. In this way, the ISG and/or ERAD can be operated to assist the internal combustion engine to propel the vehicle or to propel the vehicle without operation of the internal combustion engine. The electrical connections between the energy storage device 132, the ERAD system 124 and the ISG 114 are indicated by dashed lines in FIG. 1. Full lines are used to indicate cables for control signals and/or sensor signals.

In addition, the ISG 114 and/or the ERAD system 124 can be selectively operated to absorb torque from the front and rear drive shafts 118 and 128, respectively, whereby the energy may be stored at energy storage device 132 or exchanged between the ISG 114 and the ERAD system 124. For example, electrical energy generated by the ERAD system can be supplied to the ISG to rotate the engine 110 as means of dissipating energy. The energy storage system 132 includes a main battery pack comprising multiple batteries, capacitors, or other suitable energy storage devices. It will be appreciated that each of the front wheels 120 and the rear wheels 130 can include a friction brake 134 to provide additional braking force for decelerating the vehicle.

A control system 122 comprising power electronics is coupled to some or all of the various components of the hybrid electric propulsions system 100. For example, the control system 122 can receive operating condition information from the engine 110 such as engine speed, the ISG 114, the transmission 116, including the current gear selected, transmission turbine and drive shaft speeds, torque converter state, the ERAD 124, the energy storage device 132, including state of charge (SOC) and charge rate, the wheels 120 and 130, including vehicle speed from a sensor 136, and the position of the friction brakes 134. The control system can also receive a user input via a user input device in the form of a pedal 140 provided with a sensor 142 (only one shown in FIG. 1). For example, the control system can receive a vehicle acceleration request from a user 138 via an accelerator pedal as detected by an accelerator pedal position sensor. In addition, the control system can receive a vehicle or engine braking request from a user such as low range selection via the shift selector or a brake pedal as detected by a brake pedal position sensor. In some embodiments, the control system can identify the angle of inclination or grade of the road surface via an accelerometer or other suitable device to determine the current torque requirement.

Further, the control system 122 can transmit control signals to the engine 110 to control fuel delivery amount and timing, spark timing, valve timing, throttle position, among other engine operating parameters. Signals can also be transmitted to the ISG 114 to control the amount of torque exchanged with transmission 116 and/or engine 110, and to the transmission 116 to change gear selection and to control the state of the torque converter or clutch(-es). Further signals can be transmitted to the ERAD 124 to control the amount of torque exchanged with the driveshaft 128, to the energy storage device 132 to control the amount of energy received from or supplied to the ERAD and CISGs, and to the friction brakes to vary an amount of braking force applied at the wheels 120 and 130. As generally known in the art, the control system can adjust the operating parameters of the various driveline components via electro-mechanical or electro-hydraulic actuators, or other suitable devices.

The control system 122 may include one or more microcomputers, including a microprocessor unit, input/output ports, an electronic storage medium for executable programs and calibration values configured as read only a memory chip, a random access memory, and/or a flash memory, and a data bus. The control system 122 can execute the various control routines described herein in order to control the operation of the hybrid electric propulsion system 100. In one example, to achieve optimum negative driveline torque control during a braking operation, the control system can be configured to increase and/or maximize energy recovery while reducing and/or minimizing engine braking by utilizing the regenerative braking capability of the electric machines within the energy storage capacity and power exchange limitations of the energy storage device.

Alternatively, to achieve optimum positive driveline torque control while minimizing fuel consumption during acceleration operation, the control system can be configured to reduce and/or minimize the power output of the engine, while increasing and/or maximizing the torque supply capability of the electric machines within the energy storage capacity and power exchange limitations of the energy storage device. Preferably, low to medium accelerations and travel at relatively low speeds (city mode) are performed using the electric motor 124, High accelerations (power mode) are performed using both the electric motor 124 and the engine 110, while travel at high speed or under cold ambient temperatures are performed using the engine 110 only. Finally, if a general system failure should occur which disables the energy storage device 132, a separate energy storage device xxx is used to start the engine 110 to allow the vehicle to travel home or to the nearest repair facility (limp-home mode).

In a further example, the controls system 122 can include a plurality of control modules where each of the control modules may control a subsystem of the vehicle. For example, control system 122 can include an engine control module (ECM) to control engine operation, a transmission control module (TCM) to control transmission operation, and an integrated system controller (ISC) to control operation of the electric energy conversion and storage devices. The controls system 122 can also include an inverter for converting DC current to AC current, if the electric motor 124 is an AC motor. A first transformer unit 149 is connected to the main battery pack in the energy storage device 132 and arranged to supply a charging current to the main battery pack when connected to an external source of electricity.

The plug-in hybrid electric vehicle propulsion system 100 is provided with an additional battery 150 connected to the ISG 114 and arranged to supply electric power for starting the internal combustion engine 110.

An additional battery 150 is arranged to be connected to the ISG only, whereby it is isolated from the energy storage device 132 that forms a main battery pack. In the example shown in FIG. 1, the additional battery 150 is controlled by the control system 122 comprising a power electronics unit. The additional battery 150 is connected to the ISG 114 (indicated by dashed lines) and is arranged to receive a charging current from the ISG. In this example, the additional battery is primarily intended for starting the internal combustion engine, in case of a system failure in the main battery pack and/or the power electronics unit that prevents the energy storage device 132 from being used for propulsion. If such a failure prevents the main battery pack from supplying power to critical auxiliary equipment (not shown), then the additional battery 150 can be used for back-up purposes until said battery operates the ISG 114 to start the internal combustion engine 110. An example of such critical auxiliary equipment is electronic control means for controlling start and operation of the engine.

Figure 2:
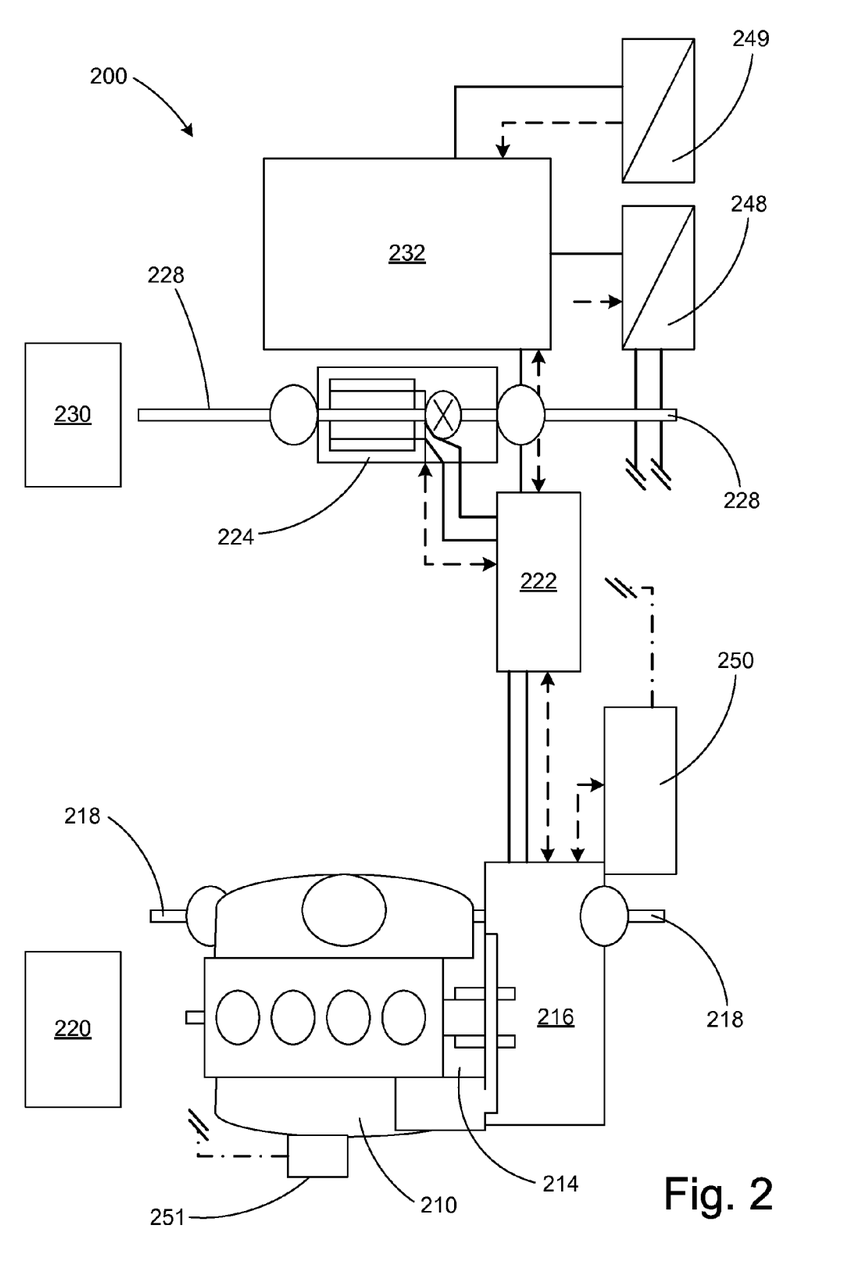
FIG. 2 shows a schematic plug-in hybrid electric propulsion system according to a second embodiment of the invention.

FIG. 2 shows a schematic plug-in hybrid electric propulsion system 200 according to a second embodiment of the invention. The hybrid electric propulsion system 200 includes a powertrain comprising an internal combustion engine (ICE) 210, a first electric energy conversion device 214, a transmission 216 for providing torque to front wheels 220, and a second electric energy conversion device or ERAD system 224 for providing torque to a rear axle 228 and the rear wheels 230.

The ISG 214 and the ERAD system 224 are operated to exchange torque with drive shafts 218 and 228, respectively. For example, the ISG 214 can be operated to supply torque to drive shaft 218 in response to electrical energy received from an energy storage device 232. Similarly, the ERAD system 224 can be operated to supply torque to the drive shaft 228 in response to electrical energy received from the energy storage device 232. In this way, the ISG and/or ERAD can be operated to assist the internal combustion engine to propel the vehicle or to propel the vehicle without operation of the internal combustion engine. The electrical connections between the energy storage device 232, the ERAD system 224 and the ISG 214 are indicated by dashed lines in FIG. 2. A control system 222 comprising power electronics is coupled to some or all of the various components of the hybrid electric propulsions system 200. The operation of the propulsion system is performed in the same way as described for the system in FIG. 1 above.

A first transformer unit 249 is connected to the main battery pack in the energy storage device 232 and arranged to supply a charging current to the main battery pack when connected to an external source of electricity. A second transformer unit 248 is arranged to receive a current from the main battery pack in order to supply electrical power to auxiliary equipment when required, either continuously or when the vehicle is operated using only the electric motor.

An additional battery 250 is arranged to be connected to the ISG only, whereby it is isolated from the energy storage device 232 that forms a main battery pack. In the example shown in FIG. 2, the additional battery 250 is controlled by a separate control system comprising an engine control unit 251. The connection between the additional battery 250 and the engine control unit 251 is indicated in dash-dotted lines. The additional battery 250 is connected to the ISG 214 (indicated by dashed lines) and is arranged to receive a charging current from the ISG. In this example, the additional battery 250 is primarily intended for starting the internal combustion engine 210, in case of a system failure in the main battery pack and/or the power electronics unit 222 that prevents the energy storage device 232 from being used for propulsion. If such a failure prevents the main battery pack from supplying power to critical auxiliary equipment (not shown), then the additional battery 250 can be used for back-up purposes until said battery operates the ISG 214 to start the internal combustion engine 210. An example of such critical auxiliary equipment is electronic control means for controlling start and operation of the engine.

Figure 3:
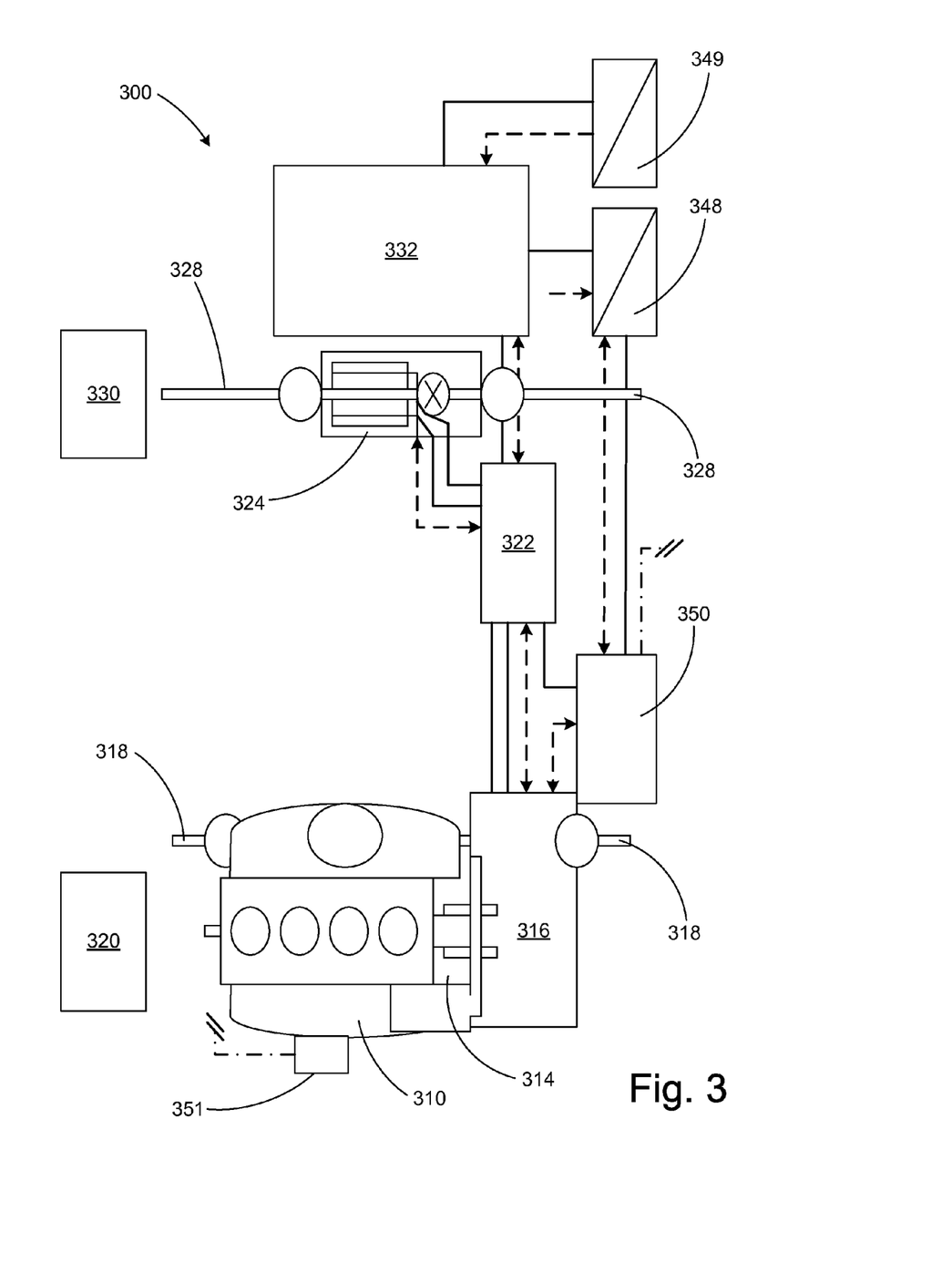
FIG. 3 shows a schematic plug-in hybrid electric propulsion system according to a third embodiment of the invention.

FIG. 3 shows a schematic plug-in hybrid electric propulsion system according to a third embodiment of the invention. The hybrid electric propulsion system 300 includes a powertrain comprising an internal combustion engine (ICE) 310, a first electric energy conversion device 314, a transmission 316 for providing torque to front wheels 320, and a second electric energy conversion device or ERAD system 324 for providing torque to a rear axle 328 and the rear wheels 330.

The ISG 314 and the ERAD system 324 are operated to exchange torque with drive shafts 318 and 328, respectively. For example, the ISG 314 can be operated to supply torque to drive shaft 318 in response to electrical energy received from an energy storage device 332. Similarly, the ERAD system 324 can be operated to supply torque to the drive shaft 328 in response to electrical energy received from the energy storage device 332. In this way, the ISG and/or ERAD can be operated to assist the internal combustion engine to propel the vehicle or to propel the vehicle without operation of the internal combustion engine. The electrical connections between the energy storage device 332, the ERAD system 324 and the ISG 314 are indicated by dashed lines in FIG. 3. A control system 322 comprising power electronics is coupled to some or all of the various components of the hybrid electric propulsions system 300. The operation of the propulsion system is performed in the same way as described for the system in FIG. 1 above.

A first transformer unit 349 is connected to the main battery pack in the energy storage device 332 and arranged to supply a charging current to the main battery pack when connected to an external source of electricity. A second transformer unit 348 is arranged to receive a current from the main battery pack in order to supply electrical power to auxiliary equipment when required, either continuously or when the vehicle is operated using only the electric motor. The second transformer unit 348 can also supply a charging current to an additional battery 350.

An additional battery 350 is arranged to be connected to the ISG 214 and to the energy storage device 332 via the second transformer unit 348. In the example shown in FIG. 2, the additional battery 350 can be controlled by either the power electronics unit 322 or a separate control system comprising an engine control unit 351. The connection between the additional battery 350 and the engine control unit 351 is indicated in dash-dotted lines. The additional battery 350 is connected to the ISG 314 (indicated by dashed lines) and is arranged to receive a charging current from the ISG. If required, a charging current can be supplied by the energy storage device 332 via the second transformer unit 348, for instance when the ISG 314 is not operated. In this example, the additional battery 350 is primarily intended for starting the internal combustion engine 310, in case of a system failure in the main battery pack and/or the power electronics unit 322 that prevents the energy storage device 332 from being used for propulsion. If such a failure prevents the main battery pack from supplying power to critical auxiliary equipment (not shown), then the additional battery 350 can be controlled by the engine control unit 351 and used for back-up purposes until said battery 350 operates the ISG 314 to start the internal combustion engine 310. An example of such critical auxiliary equipment is electronic control means for controlling start and operation of the engine.

The invention can be varied freely within the scope of the appended claims.

The invention claimed is:

1. A plug-in hybrid electric vehicle with a propulsion system comprising:
    an internal combustion engine driving a pair of wheels on a first axle and having a crankshaft;
    a transmission drivingly connecting the internal combustion engine and the wheels on the first axle;
    a starter-generator mounted on the internal combustion engine crankshaft, between said internal combustion engine and the transmission;
    at least one electric motor driving the pair of wheels on the first axle;
    a main battery pack connected to at least one further electric motor arranged to supply electric power for driving wheels on a second axle;
    a power electronics unit connected between the main battery pack and the at least one further electric motor and arranged to convert electric power from the main battery pack from a first voltage to a second voltage; wherein the power electronics unit is further connected between the main battery pack and the starter-generator and arranged to supply electric power for starting the internal combustion engine;
    a first transformer unit connected to the main battery pack and arranged to supply a charging current to the main battery pack when connected to an external source of electricity; and
    at least one additional battery isolated from the main battery pack and configured to connect to the starter-generator to supply electric power for starting the internal combustion engine in the event of failure of the main battery pack; and
    wherein the power electronics unit is arranged to detect the state of charge of the main battery pack, and wherein the power electronics unit is arranged to disconnect the main battery pack if a malfunction of the main battery pack is detected; and
    wherein the power electronics unit is arranged to connect the at least one additional battery to the starter-generator to start the internal combustion engine if the main battery pack is disconnected,
    wherein the at least one additional battery is connected to the starter-generator and supplies electricity to start the internal combustion engine only in the event of failure of the main battery pack.

2. The plug-in hybrid electric vehicle according to claim 1, wherein the at least one additional battery is connected to the starter-generator to receive a charging current from the starter-generator.

3. The plug-in hybrid electric vehicle according to claim 1, wherein the at least one additional battery is connected to the main battery pack via a second transformer unit and that said additional battery is arranged to receive a charging current from the main battery pack.

4. The plug-in hybrid electric vehicle according to claim 3, wherein the power electronics unit is arranged to detect the state of charge of the additional battery, and wherein the power electronics unit is arranged to generate a warning signal if a malfunction is detected.

5. The plug-in hybrid electric vehicle according to claim 1, wherein the power electronics unit is arranged to control the output torque from the internal combustion engine and the at least one further electric motor in response to a driver instructed power requirement.

6. The plug-in hybrid electric vehicle according to claim 5, wherein the power electronics unit is arranged to control at least one further electric motor if the driver instructed power requirement is below a first predetermined level.

7. The plug-in hybrid electric vehicle according to claim 6, wherein the power electronics unit is arranged to control the internal combustion engine if the driver instructed power requirement is above the first predetermined level and below a second predetermined level.

8. The plug-in hybrid electric vehicle according to claim 7, wherein the power electronics unit is arranged to control both the internal combustion engine and the at least one further electric motor in response to a driver instructed power requirement above the second predetermined level.

9. The plug-in hybrid electric vehicle according to claim 1, wherein the power electronics unit connected between the main battery pack and the at least one further electric motor is arranged to convert electric power from the main battery pack from a direct current to an alternating current.

10. The plug-in hybrid electric vehicle according to claim 1, wherein the at least one additional battery is isolated from the main battery pack and supplies electricity to start the internal combustion engine in the event of failure of the main battery pack.

11. A plug-in hybrid electric vehicle with a propulsion system comprising:
- an internal combustion engine driving a pair of wheels on a first axle and having a crankshaft;
- a transmission drivingly connecting the internal combustion engine and the wheels on the first axle;
- a starter-generator mounted on the internal combustion engine crankshaft, between said internal combustion engine and the transmission;
- at least one electric motor driving the pair of wheels on the first axle;
- a main battery pack connected to at least one further electric motor arranged to supply electric power for driving wheels on a second axle;
- a power electronics unit connected between the main battery pack and the at least one further electric motor and arranged to convert electric power from the main battery pack from a first voltage to a second voltage; wherein the power electronics unit is further connected between the main battery pack and the starter-generator and arranged to supply electric power for starting the internal combustion engine;
- a first transformer unit connected to the main battery pack and arranged to supply a charging current to the main battery pack when connected to an external source of electricity;
- at least one additional battery isolated from the main battery pack and configured to connect to the starter-generator to supply electric power for starting the internal combustion engine in the event of failure of the main battery pack; and
- a separate control unit that is separate from the power electronics unit; and
- wherein the power electronics unit is arranged to detect the state of charge of the main battery pack, and wherein the power electronics unit is arranged to disconnect the main battery pack if a malfunction of the main battery pack is detected; and
- wherein the separate control unit is arranged to connect the at least one additional battery to the starter-generator to start the internal combustion engine if the main battery pack is disconnected,
- wherein the at least one additional battery is connected to the starter-generator and supplies electricity to start the internal combustion engine only in the event of failure of the main battery pack.

* * * * *